(12) United States Patent
Roman

(10) Patent No.: US 6,352,238 B1
(45) Date of Patent: Mar. 5, 2002

(54) CONTROL SOLENOID OF SOLENOID VALVE, IN PARTICULAR FOR THE CONTROL OF WATERING SYSTEMS

(75) Inventor: Gianfranco Roman, Pasiano (IT)

(73) Assignee: Claber S.p.A. (IT)

( * ) Notice: Subject to any disclaimer, the term of this patent is extended or adjusted under 35 U.S.C. 154(b) by 0 days.

(21) Appl. No.: 09/543,040

(22) Filed: Apr. 5, 2000

(30) Foreign Application Priority Data

Apr. 9, 1999 (IT) ........................................ MI9900202 U

(51) Int. Cl.[7] ........................... F16K 31/08; F16K 47/00
(52) U.S. Cl. ..................................... 251/65; 251/125.15
(58) Field of Search .............................. 251/65, 129.01, 251/129.15

(56) References Cited

U.S. PATENT DOCUMENTS

| 4,004,258 A | * | 1/1977 | Arnold | 335/17 |
| 4,056,255 A | * | 11/1977 | Lace | 251/129 |
| 4,392,634 A | * | 7/1983 | Kita | 251/129 |
| 4,521,758 A | * | 6/1985 | Krubsack | 335/131 |
| 5,029,807 A | * | 7/1991 | Fuchs | 251/65 |
| 5,113,896 A | * | 5/1992 | Tortellier | 137/269 |
| 5,127,624 A | * | 7/1992 | Domke | 251/129.15 |
| 5,205,531 A | * | 4/1993 | Kolchinsky | 251/30.04 |
| 5,718,264 A | * | 2/1998 | Sturman | 137/625.65 |
| 5,727,769 A | * | 3/1998 | Suzuki | 251/129.15 |
| 5,758,931 A | * | 6/1998 | Hio et al. | 303/119.2 |
| 6,073,904 A | * | 6/2000 | Diller et al. | 251/30.03 |
| 6,161,722 A | * | 12/2000 | Sooudi et al. | 222/1 |

* cited by examiner

Primary Examiner—Joseph A. Kaufman
Assistant Examiner—David A Bonderer
(74) Attorney, Agent, or Firm—Akerman Senterfitt

(57) ABSTRACT

A control solenoid for solenoid valve, in particular for the control of watering systems, comprises a permanent magnet, an electric coil for the excitation of said magnet, a sliding piston for the control of the valve subject to the magnetic field produced by the magnet and electric connections of the solenoid to a control unit of the solenoid. The electric connections are made of "faston" type quick insertion connectors. The solenoid is made in two parts, a first internal part including the piston and the magnet is screwable onto the external casing of the solenoid valve and a second external part including the electric coil and the electric connectors is fixed to the first one in a removable way by a removable and re-insertable locking element.

2 Claims, 3 Drawing Sheets

CONTROL SOLENOID OF SOLENOID VALVE, IN PARTICULAR FOR THE CONTROL OF WATERING SYSTEMS

The present invention concerns a control solenoid for solenoid valve, in particular for the control of watering systems.

Control solenoid valves for watering systems are known that include a control solenoid made as a single body that is screwed on the external casing of the solenoid valve and is provided with small projecting electric wires that are destined to be connected by coupling with corresponding small electric wires coming from the central unit for the control of the system.

A first drawback of this known technique is represented exactly by the small electric connection wires, that hinder and slow down the operations of maintenance and the possible substitution of the solenoid.

A second drawback is due to the fact that the solenoid is made as a single body, so that a possible partial damage, for example of the electric coil, involves the substitution of the whole solenoid.

Object of the present invention it now to realise a solenoid for solenoid valve, in particular but not exclusively for watering systems, that is exempt from the aforesaid drawbacks.

According to a first innovative aspect the solenoid according to the invention is characterized in that it provides elements for electric connection that consist of quick insertion connectors of the "faston" type.

The presence of such connectors evidently makes possible the easy and quick connection and disconnection of the solenoid with respect to the wires coming from the central unit, that can obviously be in turn provided with complementary connectors of the same type, with consequent simplification and quickening of the operations of maintenance and substitution of the solenoid.

According to another innovative aspect the solenoid according to the invention is characterized in that it is made in two parts, a first internal part including the driving piston of the valve and the magnet for attraction of the same piston being screwable on the external casing of the solenoid valve and a second external part including the electric coil for the excitation of the magnet and the electric connectors being fixed to the first one in a removable way by means of a removable and re-insertable locking element.

In this way a possible breakdown of the electric coil, that obviously represents the more delicate part of the solenoid, does not involve the substitution of the whole solenoid but only of its deteriorated part.

The characteristics of the present invention will be made more evident by the following detailed description of an embodiment thereof that is illustrated as a non limiting example in the enclosed drawings, in which.

Figure 1:
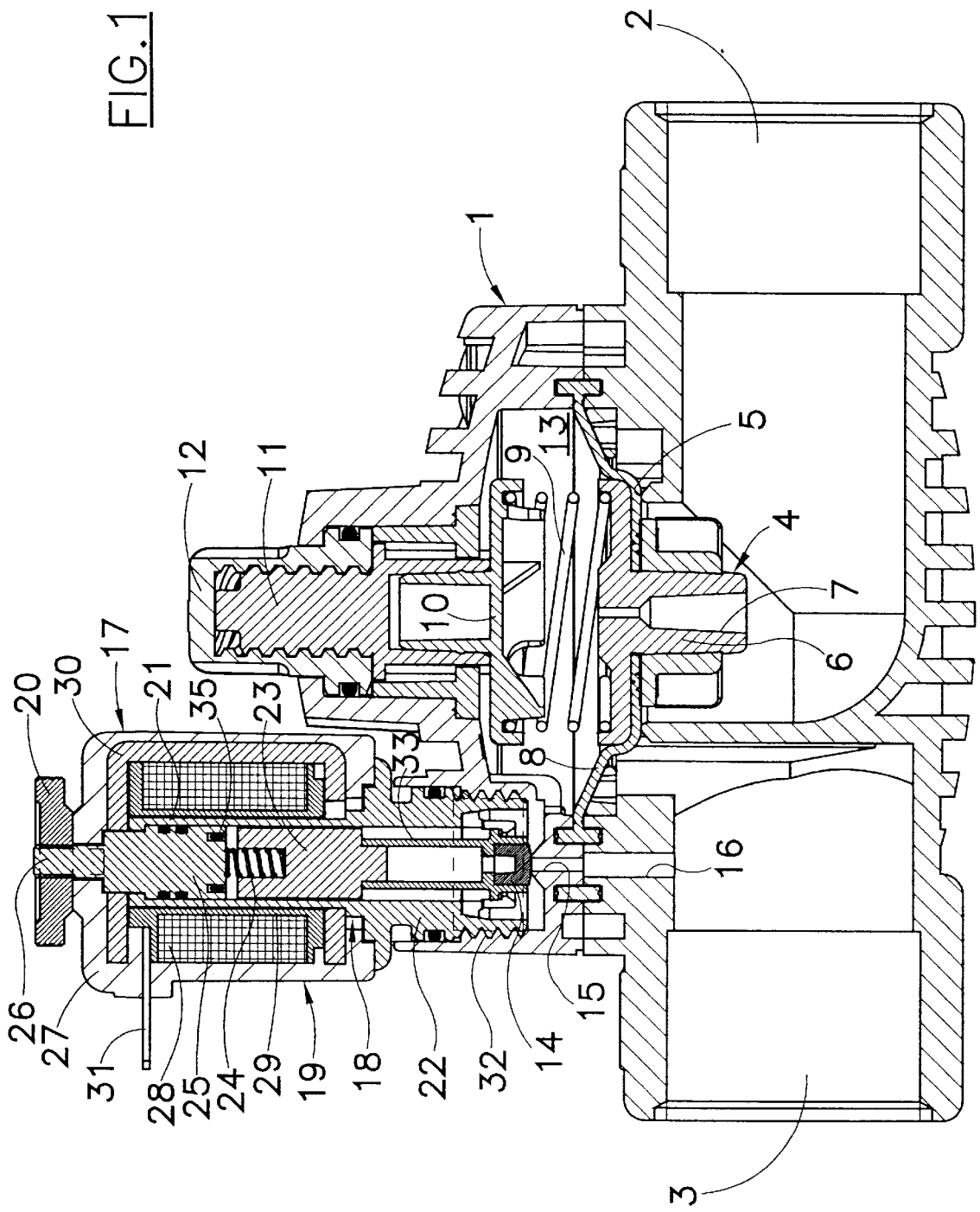
FIG. 1 shows in axial section a solenoid valve provided with a control solenoid of the monostable type according to the present invention.

In FIG. 1 a solenoid valve for watering system is illustrated, that in a way known per se comprises an external casing 1 that is made of several pieces, inside which two duct sections 2 and 3 are identified, respectively for water input and output, that are selectively separated or put in communication by a membrane valve 4 that collaborates with a transversal orifice 5 of the section 2.

The valve 4 is made up of a rigid body 6 that is axially crossed by a passage 7 and bears transversally the central part of a rubber membrane 8 that is fixed to the casing 1 at the ends and functions as a sealing element of the valve.

A spring 9 reacting between the valve 4 and a reaction disk 10 fixed by quick release to an externally threaded tang 11 that is engaged with an internally threaded box 12 that is turningly supported by the casing 1 normally maintains the valve 4, and therefore the seal membrane 8, in position of closing of the hydraulic connection between the duct section 2 and an intermediate chamber 13 that is in turn normally seal closed towards the section of duct 3 owing to a sealing insert 14 that is kept against the orifice of a passage 15 made in the casing 1 beside the chamber 13 and communicating with a transversal passage 16 of the duct section 3.

A solenoid 17, of monostable type supplied in alternate power, that is made up of two parts 18 and 19 normally kept together by an unscrewable threaded ring nut 20 provides to the opening control of the valve 4.

The internal part 18 of the solenoid 17 comprises a tubular body 21 that ends with an externally threaded axial appendix 22 that is screwable in a corresponding internally threaded housing 32 of the casing 1, in which the passage 15 opens, in order to realise the removable mechanical coupling between the solenoid and the remaining part of the solenoid valve. In the tubular body 21 in an axially sliding way there is housed the actuator element of the solenoid, that is a metallic piston 23 that bears on one end a tubular support body 33 for the sealing insert 14 and is thrust toward the other end by a spring 24 that reacts against one end of a permanent magnet 25 with copper short-circuit ring 35, that is also housed inside the tubular body 21 and has on the other end a threaded tang 26 onto which the ring nut 20 is screwed.

The external part 19 of the solenoid 17 comprises in turn a plastic mantle 27 that englobes an electric coil 28 with relative spool 29 and a metallic cylindrical support 30 open on one side, that completes the magnetic circuit comprising the magnet 25 and the piston 23.

The external part 19 is mounted onto the internal part 18 in an axially sliding way and is kept in position, as already said by the ring nut 20 that is screwed onto the tang 26.

Figure 2:
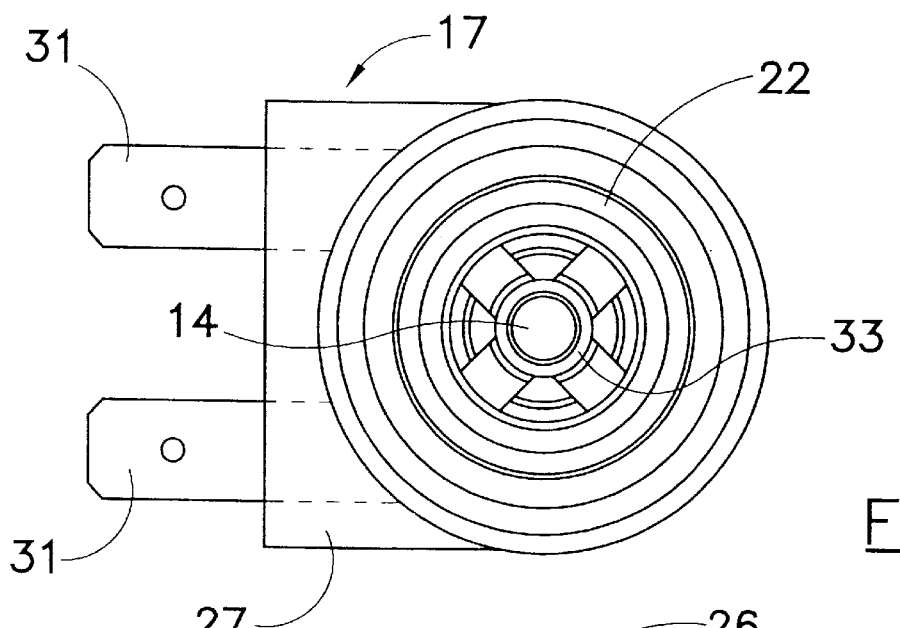
FIG. 2 shows only the solenoid in plan as viewed from the bottom.
Figure 3:
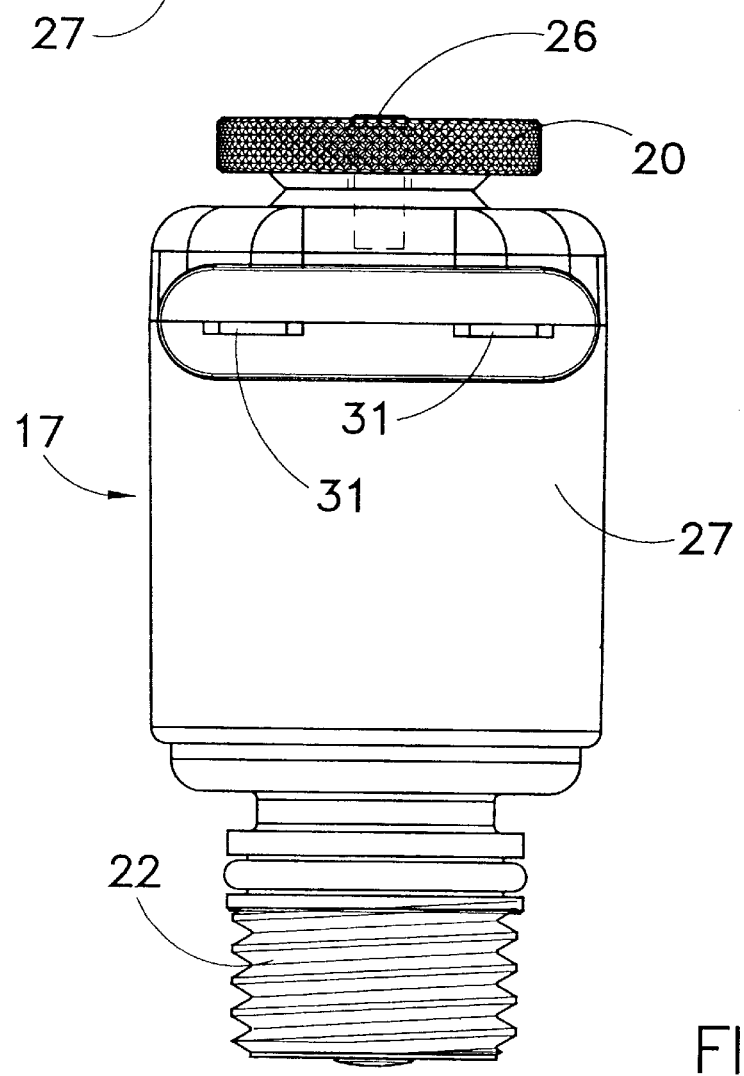
FIG. 3 shows the solenoid in side view from the left with reference to FIGS. 1 and 2.

From the external part 19 of the solenoid 17 two connectors 31 of the "faston" type (FIGS. 2 and 3) extend transversally toward the outside that are destined to couple with complementary connectors of the same type associated with connection wires of the solenoid to the electric central control unit of the system.

During operation, considering as a starting position the closed one illustrated in FIG. 1, the opening of the solenoid valve is controlled by the excitation of the coil 28 of the solenoid 17, that determines the formation of a magnetic field having such a sign as to allow the magnet 25 to attract the piston 23 for the consequent movement away of the sealing insert 14 from the orifice of the passage 15.

The water present in the intermediate chamber 13 can therefore partially flow in the duct section 3 with consequent relief of the closing pressure exerted on the valve 4, that can therefore open and allow the direct hydraulic connection between the sections of duct 2 and 3.

The interruption of the electric command previously imparted to the electric coil of the solenoid 17 determines on the other hand the inverse movement of the piston 23 with the consequent closing back of the orifice of the passage 15 and the also consequent return of the valve 4 to a position of closing under the thrust of the spring 9.

In case of breakdown of the electric coil of the solenoid 17 it is possible to proceed to the substitution of the single external part 19 of the same solenoid, while leaving the external part 19 in position. To such purpose it is sufficient to separate the connectors of the central unit connection wires from the faston connectors 31 by simple extraction of the solenoid 17, then to unscrew the ring nut 20, to remove the external part 19, to replace with a new one, to screw the ring nut 20 back and finally to insert the external connectors back on the connectors 31. As it is possible to observe, it is an extremely simple and quick operation, that does not require any intervention of specialised technical personnel.

If instead it is necessary to remove the entire solenoid, once the electric external connectors have been removed, it is sufficient to unscrew the entire unit of the solenoid from threaded housing 32 and then to put the same solenoid or other substitute one back in position with an inverse operation.

Figure 4:
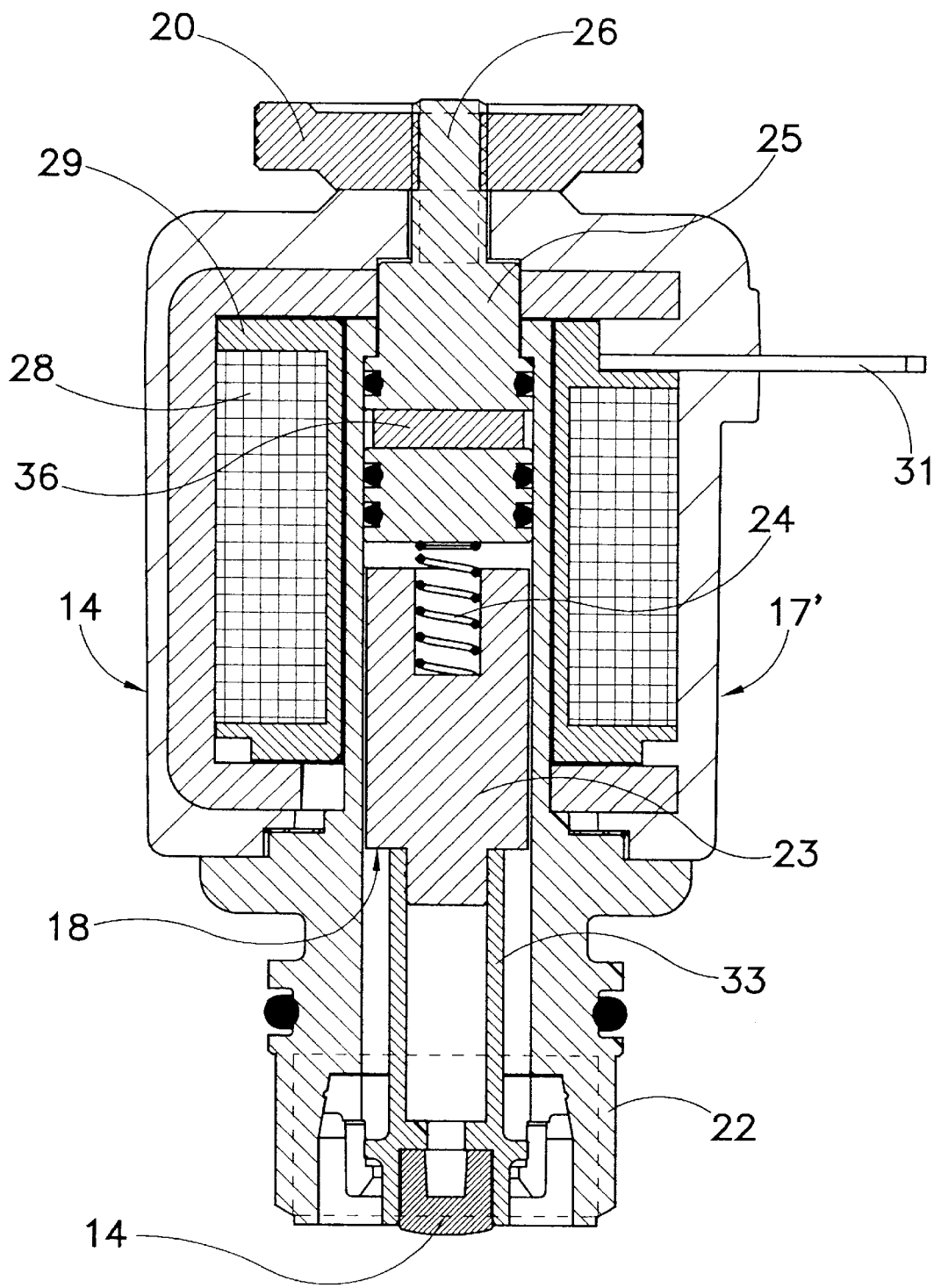
FIG. 4 shows in axial section, inverted as compared with FIG. 1, a bistable variation of the solenoid according to the invention.

The solenoid 17' in FIG. 4, where equal parts are indicated by the same reference numbers, is mechanically similar to the one in FIG. 1, from which besides it differs in the electromagnetic part, that provides the absence of the short-circuit ring 35 and the insertion, in the body of the magnet 25, of a high magnetism magnetic disk 36, for example of neodymium.

The solenoid thus becomes of a direct current bistable type, that switches into a state and remains such upon reception of a positive pulse and switches into the opposite state and remains as such upon the subsequent reception of a negative pulse.

What is claimed is:

1. A control solenoid for a solenoid valve for controlling watering systems, comprising:

a permanent magnet;

an electric coil for exciting said magnet to produce a magnetic field;

a cylinder for housing said magnet;

a valve control piston slidingly housed in said cylinder and influenced by said magnetic field produced by said magnet;

connector means for connecting the electric coil to an external solenoid control unit;

wherein said solenoid comprises an internal part including said magnet, said cylinder and said piston, the internal part being screwable into an external casing of the solenoid valve, and an external part including said electric coil and said connector means, said external part being removably fixed to said internal part by means of a removable and re-insertable locking element.

2. The solenoid according to claim 1, wherein said connector means consist of quick insertion connectors of the faston type.

* * * * *